United States Patent
Tomich et al.

(10) Patent No.: US 10,240,900 B2
(45) Date of Patent: Mar. 26, 2019

(54) SYSTEMS AND METHODS FOR ACQUIRING AND LAUNCHING AND GUIDING MISSILES TO MULTIPLE TARGETS

(71) Applicant: Raytheon Company, Waltham, MA (US)

(72) Inventors: John L. Tomich, Coppell, TX (US); William M. Casey, Celina, TX (US); Colin M. Johnston, McKinney, TX (US); Raymond Samaniego, McKinney, TX (US); David Fluckiger, Allen, TX (US); Terry McLean, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 373 days.

(21) Appl. No.: 15/015,349

(22) Filed: Feb. 4, 2016

(65) Prior Publication Data

US 2017/0227330 A1 Aug. 10, 2017

(51) Int. Cl.
| | |
|---|---|
| F41G 7/22 | (2006.01) |
| F41G 7/00 | (2006.01) |
| F41G 3/04 | (2006.01) |
| F41G 3/02 | (2006.01) |
| G01S 17/66 | (2006.01) |
| F41G 3/22 | (2006.01) |
| F41G 3/06 | (2006.01) |
| G01S 17/42 | (2006.01) |
| G01S 17/02 | (2006.01) |
| G01S 17/88 | (2006.01) |
| G01S 17/00 | (2006.01) |

(52) U.S. Cl.
CPC ............ *F41G 7/2293* (2013.01); *F41G 3/02* (2013.01); *F41G 3/04* (2013.01); *F41G 3/06* (2013.01); *F41G 3/225* (2013.01); *F41G 7/007* (2013.01); *F41G 7/2206* (2013.01); *F41G 7/2233* (2013.01); *F41G 7/2246* (2013.01); *G01S 17/023* (2013.01); *G01S 17/42* (2013.01); *G01S 17/66* (2013.01); *G01S 17/88* (2013.01)

(58) Field of Classification Search
CPC ...... F41G 7/2293; F41G 7/2233; G01S 17/88; G01S 17/023; G01S 17/66
See application file for complete search history.

(56) References Cited

U.S. PATENT DOCUMENTS

| | | | |
|---|---|---|---|
| 5,042,743 A | 8/1991 | Carney | |
| 5,114,227 A * | 5/1992 | Cleveland, Jr. | ......... G01S 17/66 356/139.05 |

(Continued)

OTHER PUBLICATIONS

Definition of the word, "laser" from dictionary.com. Retrieved on Jul. 17, 2018. (Year: 2018).*

(Continued)

*Primary Examiner* — Bernarr E Gregory
(74) *Attorney, Agent, or Firm* — Burns & Levinson, LLP; Joseph M. Maraia (57) ABSTRACT

Systems and methods that can be used in lightweight vehicles, such as lightweight small Armed Aerial Scout (AAS) vehicles, and can provide small, lightweight weapons capable of "Fire and Forget" type performance to defeat the next generation "Swarm Weapon Systems", such as, groups of high speed attack boats armed with anti ship weapons, are disclosed.

29 Claims, 9 Drawing Sheets

(56) References Cited

U.S. PATENT DOCUMENTS

| | | | | |
|---|---|---|---|---|
| 5,275,354 | A * | 1/1994 | Minor | F41G 7/2293 244/3.17 |
| 5,341,142 | A * | 8/1994 | Reis et al. | F41G 7/2293 342/64 |
| 5,855,339 | A | 1/1999 | Mead et al. | |
| 6,842,674 | B2 * | 1/2005 | Solomon | B64C 39/024 |
| 7,032,858 | B2 * | 4/2006 | Williams | G01S 13/726 |
| 7,219,853 | B2 * | 5/2007 | Williams | F41G 7/2293 |
| 7,236,121 | B2 * | 6/2007 | Caber | G01S 13/726 |
| 7,338,009 | B1 * | 3/2008 | Bobinchak et al. | F41G 7/2293 |
| 7,494,089 | B2 * | 2/2009 | Williams et al. | F41G 7/2293 |
| 7,631,833 | B1 * | 12/2009 | Ghaleb et al. | F41G 7/2233 |
| 7,742,151 | B2 | 6/2010 | Krasutsky | |
| 7,947,936 | B1 * | 5/2011 | Bobinchak et al. | F41G 7/2233 |
| 8,084,724 | B1 * | 12/2011 | Brosch et al. | F41G 7/2293 |
| 8,178,825 | B2 * | 5/2012 | Goossen et al. | F41G 7/303 |
| 8,295,547 | B1 * | 10/2012 | Cangiani | G01S 17/66 382/103 |
| 8,371,201 | B2 * | 2/2013 | Deflumere et al. | F41G 7/2293 |
| 8,487,226 | B2 * | 7/2013 | Biswell | F41G 7/2233 |
| 2004/0050240 | A1 | 3/2004 | Greene et al. | |

OTHER PUBLICATIONS

Glasgow, Bruce, et al., The Future of Anti-Aircraft Imaging Infrared Seeker Missile Threats, Proceedings. 1999 IEEE Aerospace Conference, 1999. (vol. 4 ), pp. 457-465 vol. 4.

G.Katulka, D. Lyon, F. Fresconi, D. Petrick, Development and Characterization of Low Cost Seeker Technology for US Army Applications, Dec. 1, 2008.

Beiser, Fundamental architecture of optical scanning systems, Applied Optics, Nov. 1, 1995 , vol. 34, No. 31.

* cited by examiner

SYSTEMS AND METHODS FOR ACQUIRING AND LAUNCHING AND GUIDING MISSILES TO MULTIPLE TARGETS

BACKGROUND

This invention relates generally to systems for providing "fire and forget" type performance to small, lightweight weapons and to seeker missiles used in those systems.

"Fire-and-forget" is a type of missile guidance which does not require guidance after launch such as illumination of the target or wire guidance, and can hit its target without the launcher being in line-of-sight of the target. "Fire and forget" type performance is usually obtained in an intelligent weapon using multi-mode sensing that use a guidance approach such as or similar to GPS guidance and that that initiates a search sequence, goes through an acquisition sequence, then and identification process and begins a tracking sequence. This necessitates a complex seeker which needs a large airframe, which precludes a 30 pound weapons solution.

There is a need for a system that can be used in lightweight vehicles, such as lightweight small Armed Aerial Scout (AAS) vehicles, and can provide small, lightweight weapons capable of "Fire and Forget" type performance to defeat the next generation "Swarm Weapon Systems", such as, groups of high speed attack boats armed with anti ship weapons.

BRIEF SUMMARY

Systems and methods that can be used in lightweight vehicles, such as lightweight small Armed Aerial Scout (AAS) vehicles, and can provide small, lightweight weapons capable of "Fire and Forget" type performance to defeat the next generation "Swarm Weapon Systems", such as, groups of high speed attack boats armed with anti ship weapons, are disclosed herein below.

In one or more embodiments, the system of these teachings for substantially simultaneously engaging and acquiring multiple targets and launching and guiding missiles to the multiple target includes a multi sensor component comprising a plurality of sensors, the sensors selected from at least one of optical components, electro-optical (EO) sensors, forward-looking infrared (FL IR) sensors, laser detection and ranging (LADAR) sensors and RF sensors, a communication system configured to provide angle, range and velocity vector to each imaging missile from a number of imaging missiles and to receive image data from each imaging missile, and one or more processors configured to receive sensor data from the multi sensor component, detect, identify, and track each target from the multiple targets, obtain hand off angle, angle, range and velocity vector for said each target from the multiple targets, provide the hand off angle, angle, range and velocity vector for said each target to the communications system, receive image data from said each imaging missile and overlay an image from said each imaging missile and an image from the sensor data.

In one instance, a weight of the system and the number of imaging missiles is less than 1000 pounds.

In one or more embodiments, the method of these teachings for substantially simultaneously engaging and acquiring multiple targets and launching and guiding missiles to the multiple target includes receiving sensor data from a multi sensor component; the multi sensor component comprising a plurality of sensors, the sensors selected from at least one of optical components, electro-optical (EO) sensors, forward-looking infrared (FLIR) sensors, laser detection and ranging (LADAR) sensors and RF sensors, detecting, identifying, and tracking each target from the multiple targets using the sensor data; the detecting, identifying, and tracking being performed by one or more processors receiving the sensor data, providing the hand off angle, angle, range and velocity vector for said each target to the communications system, obtaining hand off angle, angle, range and velocity vector being performed by one or more processors, receiving image data from said each imaging missile, the image data being received by a communication system and provided to the one or more processors, and overlaying an image from said each imaging missile and an image from the multi sensor component. The multi sensor component, the communication system and the one or more processors are located in or disposed on a combat vehicle. Before launch, each of the number of imaging missiles is also located in or disposed on the combat vehicle.

A number of other embodiments are also disclosed.

For a better understanding of the present teachings, together with other and further objects thereof, reference is made to the accompanying drawings and detailed description and its scope will be pointed out in the appended claims.

DETAILED DESCRIPTION

The description is not to be taken in a limiting sense, but is made merely for the purpose of illustrating the general principles of these teachings, since the scope of these teachings is best defined by the appended claims.

The above illustrative and further embodiments are described below in conjunction with the following drawings, where specifically numbered components are described and will be appreciated to be thus described in all figures of the disclosure: As used herein, the singular forms "a," "an," and "the" include the plural reference unless the context clearly dictates otherwise.

An "imaging missile," as used herein, is a missile, including sensors, that uses the emission of electromagnetic radiation from a target to track and follow it.

Systems and methods that can be used in lightweight vehicles, such as lightweight small Armed Aerial Scout (AAS) vehicles, and can provide small, lightweight weapons capable of "Fire and Forget" type performance to defeat the next generation "Swarm Weapon Systems", such as, groups of high speed attack boats armed with anti ship weapons, are disclosed herein below.

In one or more embodiments, the system of these teachings for substantially simultaneously engaging and acquiring multiple targets and launching and guiding missiles to the multiple target includes a multi sensor component comprising a plurality of sensors, the sensors selected from at least one of optical components, electro-optical (EO) sensors, forward-looking infrared (FLIR) sensors, laser detection and ranging (LADAR) sensors and RF sensors, a communication system configured to provide angle, range and velocity vector to each imaging missile from a number of imaging missiles and to receive image data from each imaging missile, and one or more processors configured to receive sensor data from the multi sensor component, detect, identify, and track each target from the multiple targets, obtain hand off angle, angle, range and velocity vector for said each target from the multiple targets, provide the hand off angle, angle, range and velocity vector for said each target to the communications system, receive image data from said each imaging missile and overlay an image from said each imaging missile and an image from the sensor data.

Figure 1:
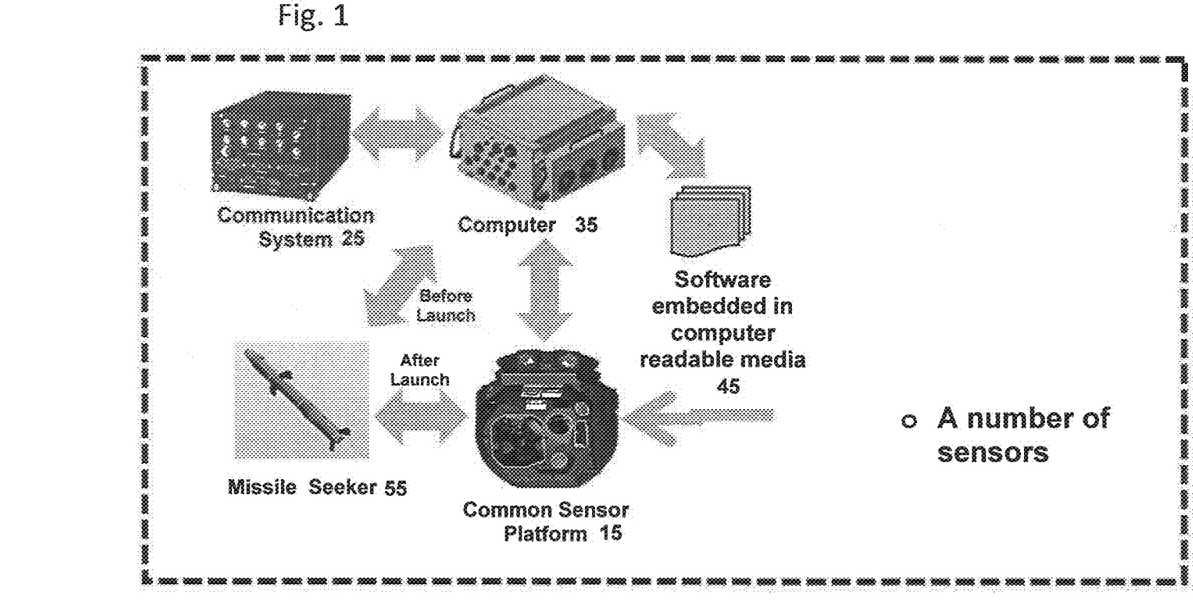
FIG. 1 shows one embodiment of the system of these teachings.

FIG. 1 shows one embodiment of the system of these teachings. Referring to FIG. 1, in the embodiment shown therein, a multi sensor component, referred to as a common sensor platform 15, has a number of sensors, the sensors selected from at least one of optical components, electro-optical (EO) sensors, forward-looking infrared (FLIR) sensors, laser detection and ranging (LADAR) sensors and RF sensors. Detection signals are received at the sensors in the multi sensor component 15. The sensor data is provided to one or more processors 35, also referred to as a computer 35. The one or more processors 35 detect, identify and track each target from multiple targets and provide the hand off angle, angle, range and velocity vector for each target to a communication system 25. The one or more processors 35, in one instance, are configured to perform tasks by executing software embedded in computer readable media 45. The communication system provides angle, range and velocity vector for one target for a target to each one of the imaging missiles 55. A launch signal is provided by either the communication system or the computer (or an external operator) to each imaging missile 55. After launch, the one or more processors 35 receive image data from each imaging missile 55 and the image data is overlaid on an image obtained from the sensor data.

In one instance, the one or more processors are also configured to overlay the image from said each imaging missile and the image from the multi sensor component before launch, and provide overlaid images to a navigator of a combat vehicle, where the multi sensor component, the communication system and the one or more processors are located in or disposed on the combat vehicle, and wherein, before launch, each of the number of imaging missiles is also located in or disposed on the combat vehicle. In one embodiment, the overlaid images are provided on a head mounted display.

Figure 2:
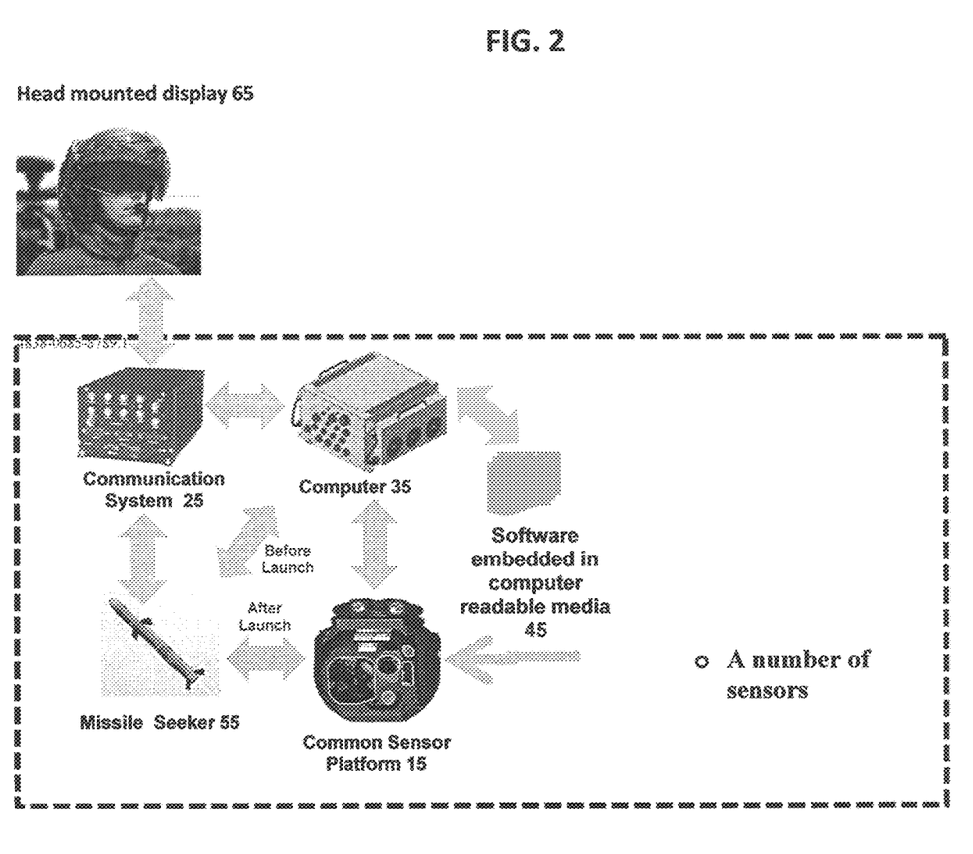
FIG. 2 shows another embodiment of these teachings.

FIG. 2 shows another embodiment of these teachings in which a navigator is provided images, on a head mounted display 65 by the communication system 25.

In another instance, the one or more processors are also configured to overlay the image from each imaging missile 55 and the image from the multi sensor component 15 after launch, determine adjustments to angle, range and velocity vector for targets for each imaging missile 55, and provide the adjustments to the communication system 25 in order to provide the adjustments to each imaging missile 55.

In yet another instance, the one or more processors are also configured to determine, from the sensor data, an unfriendly launch, determine change in targeting information needed to avoid or destroy the unfriendly launch, and provide the change in targeting information to the communication system in order to provide the change to each imaging missile.

In another embodiment, the multi sensor component and at least one of the one or more processors are located in a turret, the turret being disposed and operatively connected to the combat vehicle.

Figure 3:
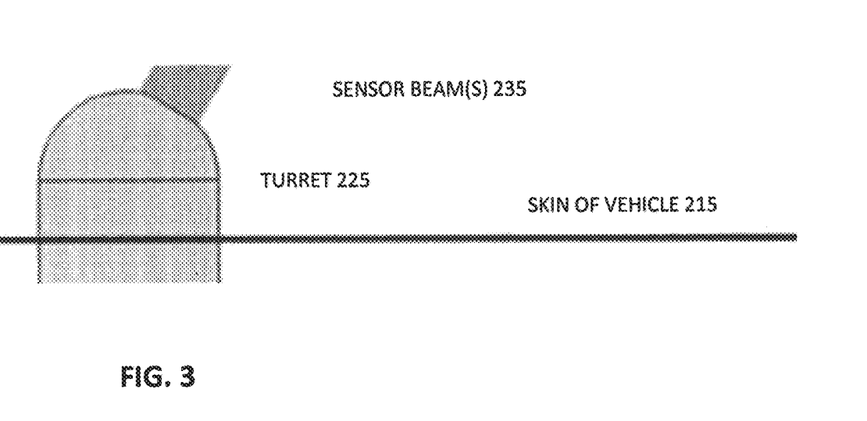
FIG. 3 shows yet another embodiment of the system of these teachings.

FIG. 3 shows another embodiment of these teachings in which the multi sensor component and at least one of the one or more processors are located in a turret 225, the turret being disposed and operatively connected on the skin 215 of combat vehicle. A beam of electromagnetic radiation is produced by active sensors in the turret 225.

In yet another embodiment, the one or more processors are configured by being operatively connected to an input/output component and to one or more non-transitory computer usable media having computer readable code embodied therein, the computer readable code, when executed by the one or more processors, causes the one or more processors to perform the actions disclosed hereinabove.

Figure 4:
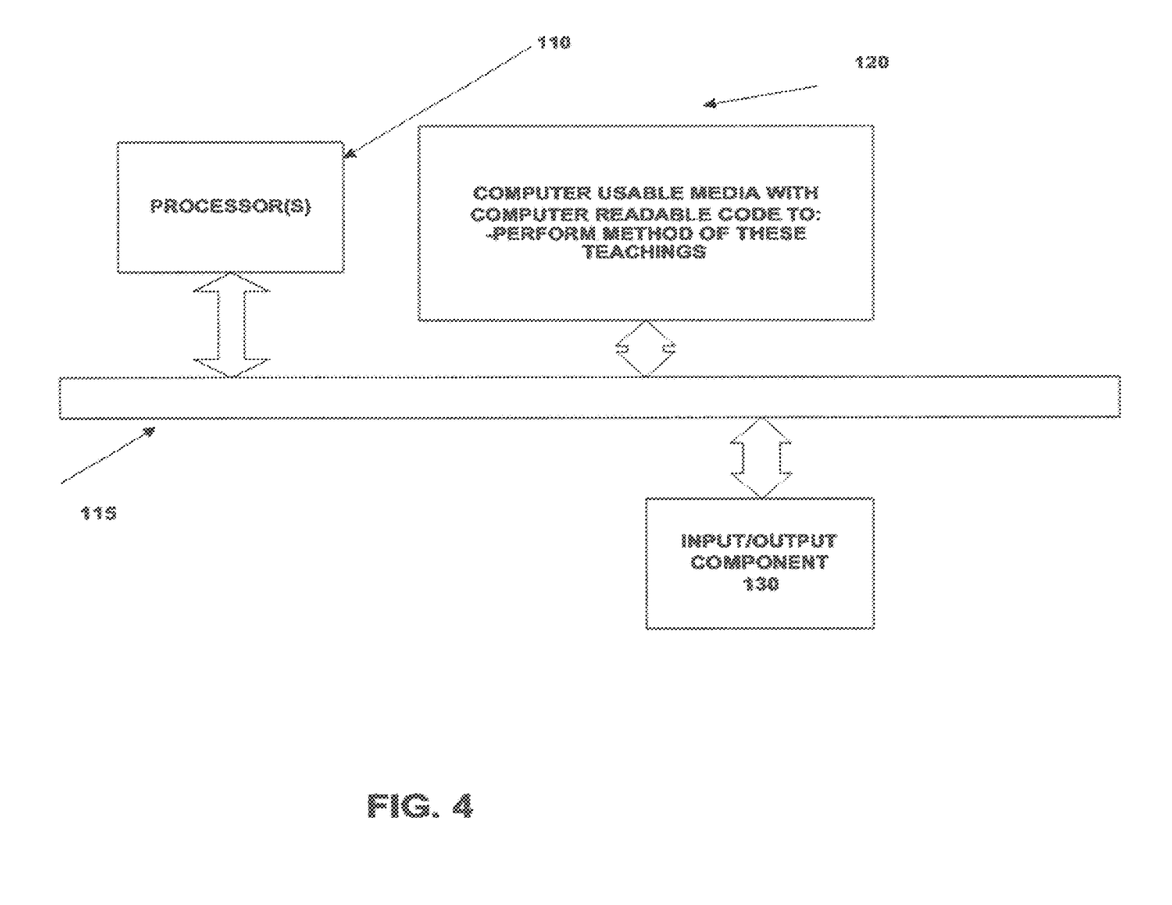
FIG. 4 shows yet another embodiment of the system of these teachings.

FIG. 4 shows another embodiment of these teachings in which the one or more processors are configured by being operatively connected to an input/output component and to one or more non-transitory computer usable media having computer readable code embodied therein, the computer readable code, when executed by the one or more processors, causes the one or more processors to perform the actions disclosed hereinabove.

Referring to FIG. 4, in the embodiment shown therein, an input output component 130 is operatively connected to one or more processors 110 enabling the one or more processors 110 to receive sensor data. Computer usable media 120 having computer readable code that, when executed by the one or more processors 110, causes the one or more processors 110 to perform the method of these teachings, as partially disclosed hereinabove. The input-output component 130 and the computer usable media 120 are operatively connected to the one or more processors 110 by a computer connection component 115 (such as a computer bus).

In one embodiment, a weight of the system and the number of imaging missiles is less than 1000 pounds. In another embodiment, a weight of the system and the number of imaging missiles is between about 500 pounds and about 1000 pounds. In one instance, a weight of each imaging missile from the number of imaging missiles is less than 50 pounds. In another instance, a weight of said each imaging missile from the number of imaging missiles is at most 30 pounds. Each imaging missile includes at least one seeker sensor located at a head of each imaging missile and a communication component disposed to communicate with the system. In one instance, the at least one seeker sensor includes at least one of an electro-optical (EO) tracker sensor, a forward-looking infrared (FLIR) tracker sensor, and a laser detection and ranging (LADAR) tracker sensor. In another instance, the at least one seeker sensor includes at least one of an electro-optical (EO) tracker sensor, a forward-looking infrared (FLIR) tracker sensor, and a laser detection and ranging (LADAR) tracker sensor configured to provide an X-Y scan of a target area with a laser of a predetermined wavelength in order to provide a center of mass determination of one target. The ranging (LADAR) tracker sensor is configured such that, instead of scanning the entire target extent with a fine beam and creating an image and interpreting that for tracking the target (which takes time), the LADAR tracking sensor makes an X-Y scan of the target with a laser of a predetermined wavelength thereby allowing a center of mass determination for tracking the moving target. The above described scanning can be accomplished very fast allowing the missile to have a high dynamic response to target movement. In one embodiment, the wavelength of the laser is in the green region of the visible spectrum in order to minimize sea clutter.

Figure 5A:
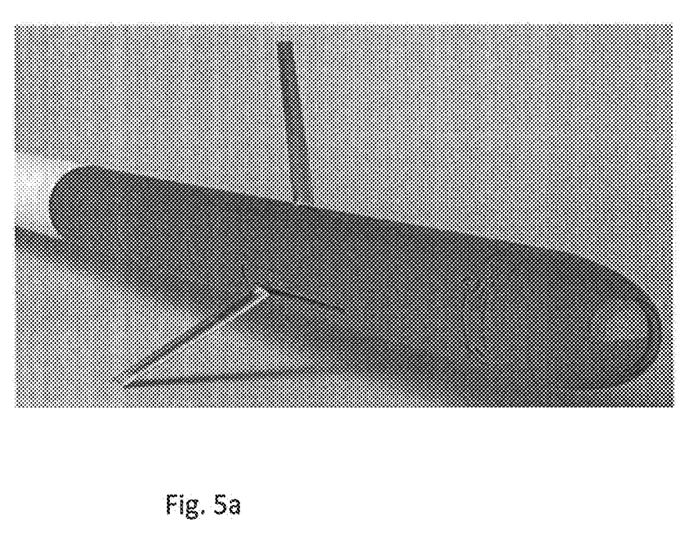
FIGS. 5a-5d depict exemplary embodiments of imaging missiles as used in these teachings.
Figure 5B:
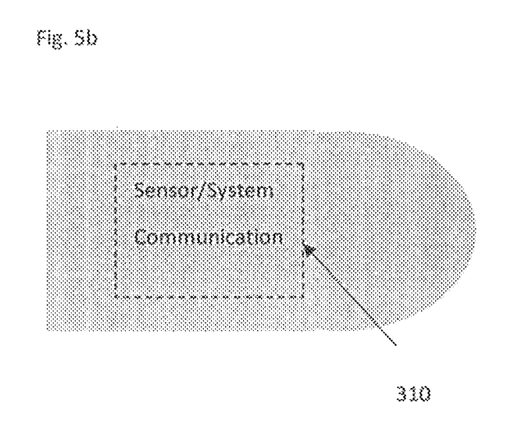
Figure 5C:
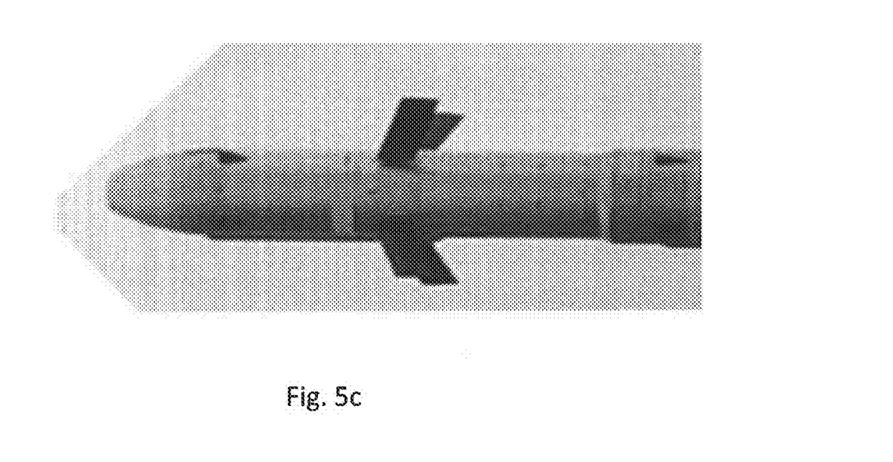
Figure 5D:
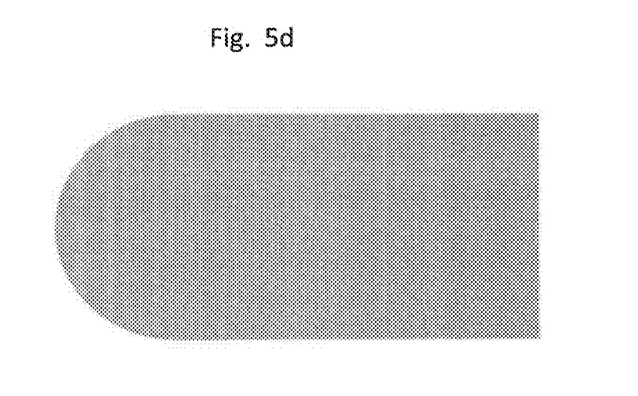

FIGS. 5a-5d show sample imaging missiles and their outlines. FIG. 5a shows one exemplary embodiment of an imaging missile, whose outline is shown in FIG. 5b. FIG. 5c shows one exemplary embodiment of an imaging missile, whose outline is shown in FIG. 5d. The outline of the exemplary embodiment shown in FIG. 5a also identifies the seeker sensor and communication component 310 located between a head and back of each imaging missile.

Figure 7:
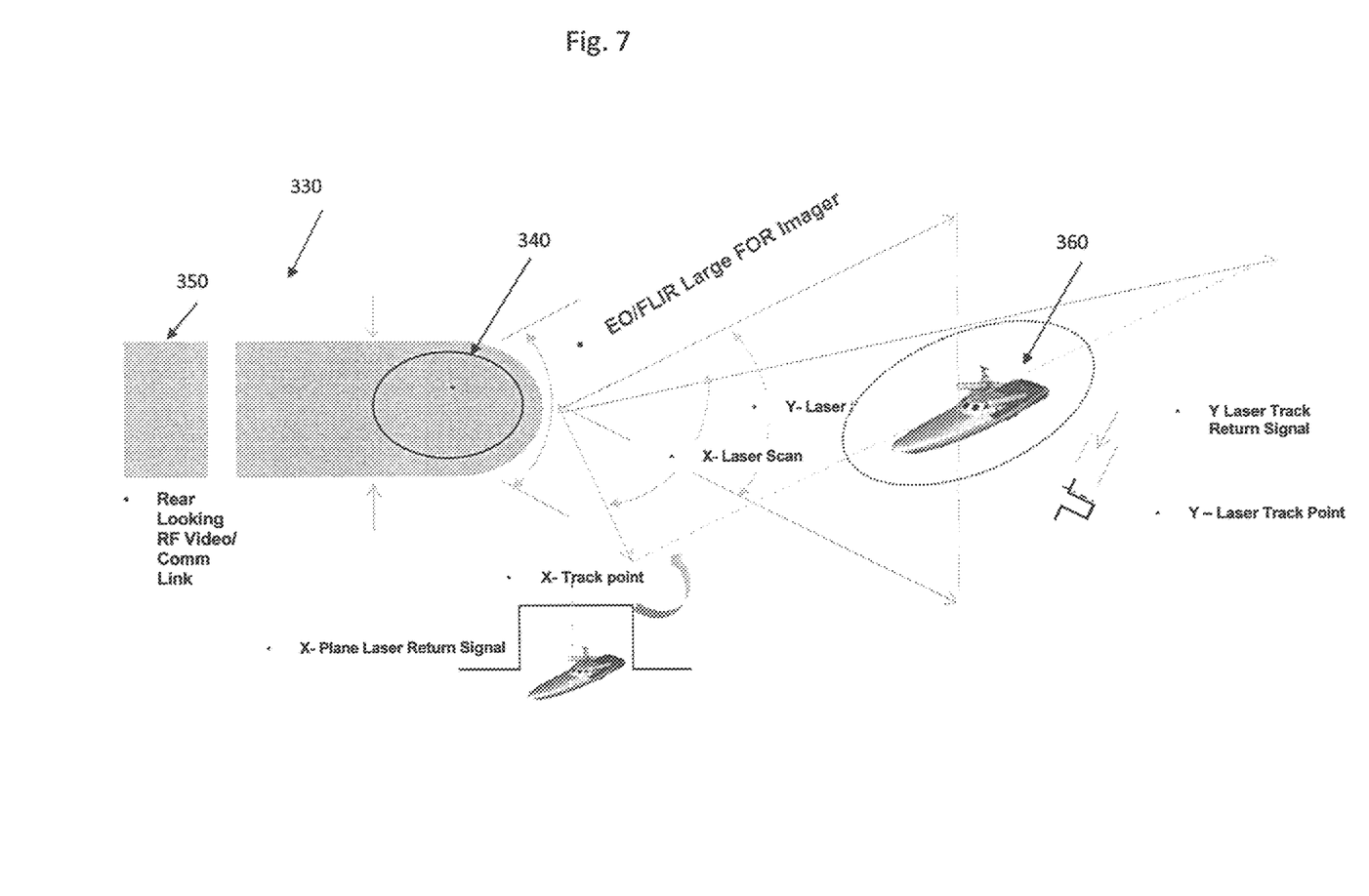
FIG. 7 shows operation of one embodiment of an imaging missile as used in these teachings.

FIG. 7 shows operation of one embodiment of an imaging missile including at least one of an electro-optical (EO) tracker sensor and a forward-looking infrared (FLIR) tracker sensor, and a laser detection and ranging (LADAR) tracker sensor configured to provide an X-Y scan of a target area with a laser of a predetermined wavelength in order to provide a center of mass determination of one target. (Scanning of the emission of the laser can be performed by one of many conventional methods such as described in Beiser, Fundamental architecture of optical scanning systems, APPLIED OPTICS, 1 Nov. 1995, Vol. 34, No. 31, which is incorporated by reference herein in its entirety and for all purposes.)

Referring to FIG. 7, in the embodiment shown therein, the imaging missile 330 includes at least one seeker sensor 340 located at the head of the imaging missile 330 and a communication component 350 disposed to communicate with the system. The seeker sensors 340 include at least one of an electro-optical (EO) tracker sensor, a forward-looking infrared (FL IR) tracker sensor, and a laser detection and ranging (LADAR) tracker sensor configured to provide an X-Y scan of a target area with a laser of a predetermined wavelength in order to provide a center of mass determination of one target 360.

In one or more embodiments, the method of these teachings for substantially simultaneously engaging and acquiring multiple targets and launching and guiding missiles to the multiple target includes receiving sensor data from a multi sensor component; the multi sensor component comprising a plurality of sensors, the sensors selected from at least one of optical components, electro-optical (EO) sensors, forward-looking infrared (FL IR) sensors, laser detection and ranging (LADAR) sensors and RF sensors, detecting, identifying, and tracking each target from the multiple targets using the sensor data; the detecting, identifying, and tracking being performed by one or more processors receiving the sensor data, providing the hand off angle, angle, range and velocity vector for said each target to the communications system, obtaining hand off angle, angle, range and velocity vector being performed by one or more processors, receiving image data from said each imaging missile, the image data being received by a communication system and provided to the one or more processors, and overlaying an image from said each imaging missile and an image from the multi sensor component. The multi sensor component, the communication system and the one or more processors are located in or disposed on a combat vehicle. Before launch, each of the number of imaging missiles is also located in or disposed on the combat vehicle.

In one instance, the image from each imaging missile and the image from the sensor data are overlaid before launch, and the method also includes providing overlaid images to a navigator of the combat vehicle.

In another instance, the image from each imaging missile and the image from the sensor data are overlaid after launch, and the method also includes determining adjustments to angle, range and velocity vector for targets for each imaging missile, and providing the adjustments to the communication system in order to provide the adjustments to each imaging missile.

In another embodiment, the method also includes determining, from the sensor data, an unfriendly launch, determining change in targeting information needed to avoid or destroy the unfriendly launch, and providing the change in targeting information to the communication system in order to provide the change to each imaging missile.

In another embodiment, the method of these teachings for providing high dynamic response to target movement in an imaging missile includes scanning emission from at least one laser of a predetermined wavelength in a laser detection tracker sensor over a target area, providing an X-Y scan of the target area and obtaining a center of mass determination for one target. In one instance, the center of mass determination is used to assist another seeker sensor in tracking the target.

Figure 6:
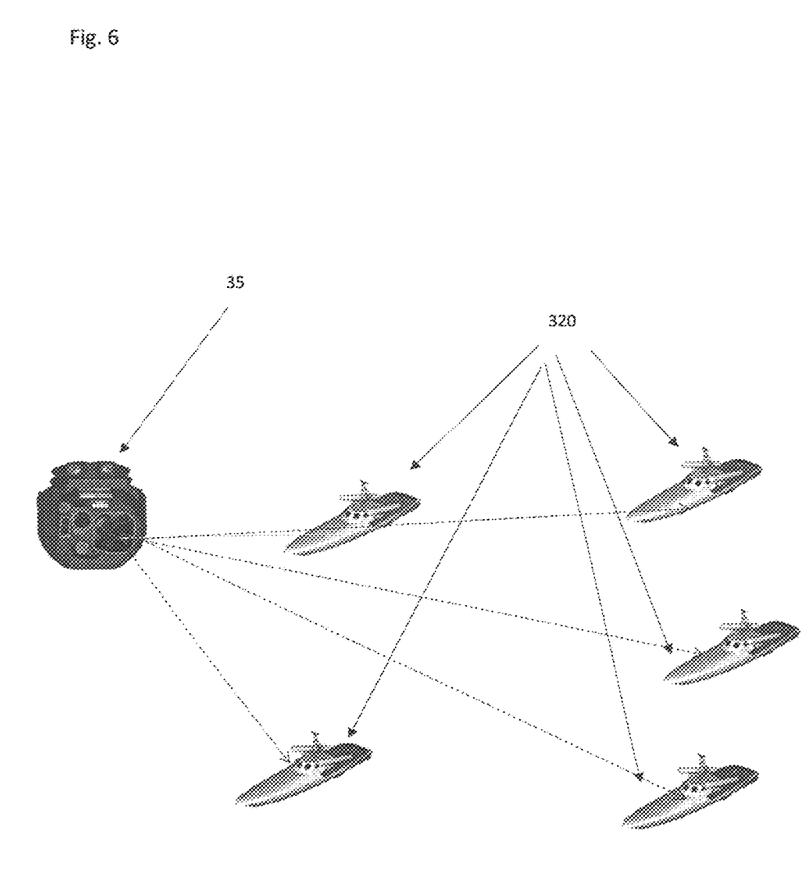
FIG. 6 shows an exemplary embodiment of a multi sensor component receiving sensor data from multiple targets.

FIG. 6 shows an exemplary embodiment of a multi sensor component 35 receiving sensor data from multiple targets 320.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:
1. A system comprising:
a multi sensor component comprising a plurality of sensors, sensors in the plurality of sensors selected from at least one of optical components, electro-optical (EO) sensors, forward-looking infrared (FL IR) sensors, laser detection and ranging (LADAR) sensors and RF sensors;
a communication system configured to provide angle, range and velocity vector to each imaging missile from a number of imaging missiles and to receive image data from each imaging missile; and
one or more processors configured to:
receive sensor data from the multi sensor component;
detect, identify, and track each target from the multiple targets;
obtain hand off angle, angle, range and velocity vector for said each target from the multiple targets;
provide the hand off angle, angle, range and velocity vector for said each target to the communications system;
receive image data from said each imaging missile;
overlay an image from said each imaging missile and an image from the sensor data.

2. The system of claim 1 wherein the one or more processors are also configured to:
overlay the image from said each imaging missile and the image from the multi sensor component before launch; and
provide overlaid images to a navigator of a combat vehicle; where the multi sensor component, the communication system and the one or more processors are located in or disposed on the combat vehicle; and wherein, before launch, each of the number of imaging missiles is also located in or disposed on the combat vehicle.

3. The system of claim 2 wherein the overlaid images are provided on a head mounted display.

4. The system of claim 1 wherein the one or more processors are also configured to:
overlay the image from said each imaging missile and the image from the multi sensor component after launch;
determine adjustments to angle, range and velocity vector for targets for said each imaging missile; and
provide the adjustments to the communication system in order to provide the adjustments to said each imaging missile.

5. The system of claim 1 wherein the one or more processors are also configured to:
determine, from the sensor data, an unfriendly launch;
determine change in targeting information needed to avoid or destroy the unfriendly launch; and provide the change in targeting information to the communication system in order to provide the change to said each imaging missile.

6. The system of claim 1 wherein the multi sensor component and at least one of the one or more processors are located in a turret; the turret being disposed and operatively connected to a combat vehicle.

7. The system of claim 1 wherein the one or more processors are configured by being operatively connected to an input/output component and to one or more non-transitory computer usable media having computer readable code embodied therein, the computer readable code, when executed by the one or more processors, causes the one or more processors to:
receive sensor data from the multi sensor component;
detect, identify, and track each target from the multiple targets;
obtain hand off angle, angle, range and velocity vector for said each target from the multiple targets;
provide the hand off angle, angle, range and velocity vector for said each target to the communications system;
receive image data from said each imaging missile;
overlay an image from said each imaging missile and an image from the sensor data;
wherein the input/output component is also operatively connected to the communication system.

8. The system of claim 7 wherein the computer readable code also causes the one or more processors to:
overlay the image from said each imaging missile and the image from the sensor data before launch; and
provide overlaid images to a navigator of a combat vehicle; where the number of imaging missiles, the multi sensor component, the communication system and the one or more processors are located in or disposed on the combat vehicle.

9. The system of claim 7 wherein the computer readable code also causes the one or more processors to:
overlay the image from said each imaging missile and the image from the sensor data after launch;
determine adjustments to angle, range and velocity vector for targets for said each imaging missile; and
provide the adjustments to the communication system in order to provide the adjustments to said each imaging missile.

10. The system of claim 7 wherein the computer readable code also causes the one or more processors to:
determine, from the sensor data, an unfriendly launch;
determine change in targeting information needed to avoid or destroy the unfriendly launch; and provide the change in targeting information to the communication system in order to provide the change to said each imaging missile.

11. The system of claim 1 wherein a weight of the system and the number of imaging missiles is less than 1000 pounds.

12. The system of claim 11 wherein a weight of said each imaging missile from the number of imaging missiles is less than 50 pounds.

13. The system of claim 11 wherein a weight of said each imaging missile from the number of imaging missiles is at most 30 pounds.

14. The system of claim 1 wherein a weight of the system and the number of imaging missiles is between about 500 pounds and about 1000 pounds.

15. The system of claim 1 wherein said each imaging missile comprises at least one seeker sensor located at a head of said each imaging missile and a communication component disposed to communicate with the system.

16. The system of claim 15 wherein said at least one seeker sensor comprises at least one of an electro-optical (EO) tracker sensor, a forward-looking infrared (FL IR) tracker sensor.

17. The system of claim 15 wherein said at least one seeker sensor comprises at least one of an electro-optical (EO) tracker sensor, a forward-looking infrared (FL IR) tracker sensor, and a laser detection and ranging (LADAR) tracker sensor configured to provide an X-Y scan of a target area with a laser of a predetermined wavelength.

18. The system of claim 17 wherein the predetermined wavelength is in a green region of a visible spectrum.

19. The system of claim 1 wherein said each imaging missile comprises:
at least one seeker sensor located at a head of said imaging missile; a laser detection and ranging (LADAR) tracker sensor configured to provide an X-Y scan of a target area with a laser of a predetermined wavelength; and
a communication component disposed to communicate with the communication system.

20. The system of claim 19 wherein said at least one seeker sensor comprises at least one of an electro-optical (EO) tracker sensor, a forward-looking infrared (FLIR) tracker sensor.

21. The system of claim 19 wherein the predetermined wavelength is in a green region of a visible spectrum.

22. The system of claim 19 wherein a weight of the imaging missile is less than 50 pounds.

23. The system of claim 19 wherein a weight of the imaging missile is at most 30 pounds.

24. A method for substantially simultaneously engaging in acquiring multiple targets and in launching and guiding missiles to the multiple targets, the method comprising:

receiving sensor data from a multi sensor component; the multi sensor component comprising a plurality of sensors, sensors in the plurality of sensors selected from at least one of optical components, electro-optical (EO) sensors, forward-looking infrared (FL IR) sensors, laser detection and ranging (LADAR) sensors and RF sensors;

detecting, identifying, and tracking each target from the multiple targets using the sensor data; the detecting, identifying, and tracking being performed by one or more processors receiving the sensor data;

obtaining hand off angle, angle, range and velocity vector for said each target from the multiple targets;

providing the hand off angle, angle, range and velocity vector for said each target to a communications system; obtaining hand off angle, angle, range and velocity vector being performed by one or more processors;

receiving image data from said each imaging missile; the image data being received by a communication system and provided to the one or more processors; and overlaying an image from said each imaging missile and an image from the multi sensor component;

wherein the multi sensor component, the communication system and the one or more processors are located in or disposed on a combat vehicle; and wherein, before launch, each of the number of imaging missiles is also located in or disposed on the combat vehicle.

25. The method of claim 24 wherein the image from said each imaging missile and the image from the sensor data are overlaid before launch; and where in the method further comprises providing overlaid images to a navigator of the combat vehicle.

26. The method of claim 24 wherein the image from said each imaging missile and the image from the sensor data are overlaid after launch; and where in the method further comprises:
   determining adjustments to angle, range and velocity vector for targets for said each imaging missile; and
   providing the adjustments to the communication system in order to provide the adjustments to said each imaging missile.

27. The method of claim 24 further comprising:
   determining, from the sensor data, an unfriendly launch;
   determining change in targeting information needed to avoid or destroy the unfriendly launch; and
   providing the change in targeting information to the communication system in order to provide the change to said each imaging missile.

28. The method of claim 24 wherein said image data includes data obtained by:
   scanning emission from at least one laser of a predetermined wavelength in a laser detection tracker sensor over a target area;
   providing an X-Y scan of the target area; and
   obtaining a center of mass determination for one target.

29. The method of claim 28 further comprising using the center of mass determination to assist another seeker sensor.

* * * * *